(12) United States Patent
Yang

(10) Patent No.: US 6,895,361 B2
(45) Date of Patent: May 17, 2005

(54) ADAPTIVE MOTION ESTIMATION APPARATUS AND METHOD

(75) Inventor: Seung-Joon Yang, Suwon (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 58 days.

(21) Appl. No.: 10/368,560

(22) Filed: Feb. 20, 2003

(65) Prior Publication Data

US 2003/0163281 A1 Aug. 28, 2003

(30) Foreign Application Priority Data

Feb. 23, 2002 (KR) .......................................... 2002-9746

(51) Int. Cl.[7] .......................................... G06F 101/14
(52) U.S. Cl. ..................................... 702/179; 714/100
(58) Field of Search ................................ 702/179, 185; 714/100

(56) References Cited

U.S. PATENT DOCUMENTS

| | | | | |
|---|---|---|---|---|
| 5,428,403 A | * | 6/1995 | Andrew et al. ............. | 348/699 |
| 5,786,860 A | * | 7/1998 | Kim et al. ............. | 375/240.15 |
| 6,195,389 B1 | * | 2/2001 | Rodriguez et al. ..... | 375/240.16 |
| 6,269,121 B1 | * | 7/2001 | Kwak ..................... | 375/240.16 |
| 6,724,823 B2 | * | 4/2004 | Rovati et al. .......... | 375/240.17 |

* cited by examiner

Primary Examiner—Edward Raymond
(74) Attorney, Agent, or Firm—Staas & Halsey LLP

(57) ABSTRACT

An adaptive motion estimation apparatus and method. A full search motion estimation part obtains a motion vector from all blocks in a predetermined search range based on a current frame and/or field and a reference frame and/or field and a prediction motion estimation part estimates a motion vector from ambient blocks about a block in which a candidate motion vector is estimated. A motion vector selection part determines a motion vector having a position value of a smallest error in comparison with a stored threshold value among the obtained and estimated motion vectors as a final motion vector. Since the full search motion estimation algorithm and the prediction motion estimation algorithm are adaptively selected, a smooth and correct motion vector reflecting an actual motion is obtainable.

20 Claims, 3 Drawing Sheets

ADAPTIVE MOTION ESTIMATION APPARATUS AND METHOD

CROSS-REFERENCE TO RELATED APPLICATIONS

This application claims the benefit of Korean Application No. 2002-9746 filed Feb. 23, 2002, in the Korean Intellectual Property Office, the disclosure of which is incorporated herein by reference.

BACKGROUND OF THE INVENTION

1. Field of the Invention

The present invention relates to an apparatus for and a method of adaptive motion estimation, and more particularly to an adaptive motion estimation apparatus and method of adaptively selecting one of a full search motion estimation method and a prediction motion estimation method and estimating motion vectors according to the adaptively selected method.

2. Description of the Prior Art

Image data having multiple dimension characteristics has a greater amount of information that general data. A vast amount of data is required to represent visual images as digitized images. In order to process, store, and transfer such digital images, various transfer and storage media are available which use very large scale integration VLSI and signal processing technologies, but data compression technologies of a high compression ratio are required when considering bandwidths of communication paths needed for transferring the digitized images, storage capacities necessary for storing the digital images, etc.

High autocorrelations of image signals cause a redundancy in most occasions, so that effective data compressions are obtainable by removing such redundancy. In order to effectively compress time-varying video frames/fields, removal of the redundancy in the two-dimensional space and in the time-axis direction is required.

The removal of the redundancy in the time-axis direction is based on a concept that an amount of data to be transferred is greatly reduced by replacing unchanged portions or moved-but-still-similar portions in a current frame/field with corresponding portions in an immediately preceding frame/field, i.e., a reference frame/field.

To make the replacement, it is necessary to find the most similar block between the current frame/field and the reference frame/field, which is called a "motion estimation," and an indication of an amount of displacement of the block, which is called a "motion vector."

That is, the motion vector is two-dimensional information and indicates a motion amount in two-dimensional X-Y coordinates of an object which occurs between the reference frame/field and the current frame/field. Therefore, the motion vector is composed of a magnitude of the motion in a horizontal direction and a magnitude of the motion in a vertical direction.

Typical methods for estimating motion vectors are a Block Matching Algorithm (BMA) and a Pel Recursive Algorithm (PRA). The Block Matching Algorithm is generally used in consideration of precision, efficiency, real-time processing ability, hardware implementation, etc.

The Block Matching Algorithm compares two consecutive images such as the reference frame/field and the current frame/field by block unit and then estimates a motion based on a matching degree of corresponding signal patterns. In the Block Matching Algorithm, estimations and compensations are carried out by a certain size, that is by a unit of a set of M pixels in the horizontal direction and N pixels in the vertical direction. The pixel set is called a "macroblock" which is generally represented as M×N.

Using the Block Matching Algorithm and the like, a motion vector is estimated with reference to the current frame/field and the reference frame/field, and a motion compensation prediction is carried out by using the estimated motion vector.

FIG. 1 is a block diagram of a conventional full search motion estimation apparatus.

The conventional full search motion estimation apparatus shown in FIG. 1 has a reference frame/field storage part 10 a current frame/field storage part 12, and a full search motion estimation part 14.

The reference frame/field storage part 10 and the current frame/field storage part 12 store a current frame/field and a reference frame/field, respectively, to be used for the estimation of a motion vector.

The full search motion estimation part 14 estimates the motion vector by a full search algorithm by using the frame/field stored in the reference frame/field storage part 10 and the current frame/field storage part 12.

The full search algorithm defines a search range and selects as a motion vector a position of a block indicating a minimal matching error out of all the blocks possible within a maximum displacement of the search range. Since, within the search range, pattern matchings are carried out with all the blocks in the current frame/field and the reference frame/field, motion information of a very high precision may be found where an actual maximum motion of a block does not deviate from the search range.

FIG. 2 is a block diagram of a conventional prediction motion estimation apparatus.

The conventional prediction motion estimation apparatus of FIG. 2 has a reference frame/field storage part 20, a current frame/field storage part 22, a prediction motion estimation part 24, and a candidate vector generation part 30. The candidate vector generation part 30 has a candidate motion vector generator 32 and a motion vector storage 34.

The reference frame/field storage part 20 and the current frame/field storage part 22 store a current frame/field and a reference frame/field, respectively, to be used for the estimation of a motion vector.

The prediction motion estimation part 24 estimates a motion vector by a prediction motion estimation algorithm. Unlike the full search algorithm, the prediction motion estimation algorithm estimates a motion vector for ambient blocks about a block in which a candidate motion vector is estimated. The candidate motion vector is provided to the prediction motion estimation part from the candidate motion vector generation part 30. The candidate motion vector provided by the candidate vector generation part 30 is useable after a motion vector estimated by the prediction motion estimation part 24 is stored in the vector storage 34. An externally input motion vector is also useable.

The full search motion estimation apparatus has a problem of not estimating smooth motion vectors reflecting actual motions where a size of the block increases. In particular, the full search motion estimation apparatus is likely to search incorrect motion vectors where motion of an object exists on an edge of an image. In order for the full search motion estimation apparatus to estimate smooth motion vectors reflecting actual motions, the motion vectors should be obtained by lessening a block size or overlapping blocks, which causes a problem of calculations becoming more complicated.

The prediction motion estimation algorithm estimates smooth motion vectors reflecting actual motions more accurately than the full search algorithm, but the prediction motion estimation algorithm may generate a case where correct motion vectors are not searched, resulting in wrong motion vectors being used as candidate motion vectors. In such a case, since correct motion vectors are not used, a visual effect may be more deteriorated than the visual effect using methods in which motion information is not used.

SUMMARY OF THE INVENTION

The present invention has been made to solve the above problems. An object of the present invention is to provide an adaptive motion estimation apparatus and a method of adaptively selecting one of a motion vector provided by a full search motion estimation algorithm and a motion vector provided by a prediction motion estimation algorithm to obtain smooth and correct motion vectors reflecting actual motions.

Additional objects and advantages of the invention will be set forth in part in the description which follows, and, in part, will be obvious from the description, or may be learned by practice of the invention.

In order to achieve the above and/or other objects of the invention, an adaptive motion estimation apparatus according to the present invention comprises a full search motion estimation part which obtains a motion vector from all blocks in a predetermined search range based on a current frame and/or field and a reference frame and/or field, a prediction motion estimation part which estimates a motion vector from ambient blocks about a block in which a predetermined candidate motion vector is estimated, and a motion vector selection part which inputs the motion vectors from the full search motion estimation part and the prediction motion estimation part, and which selects one of the input motion vectors as a final motion vector. The final motion vector may be the input motion vector having a position value of a smallest error in comparison with a stored threshold value. The adaptive motion estimation apparatus may further comprise a candidate vector generation part which provides the prediction motion estimation part with the candidate motion vector.

The candidate vector generation part may further comprise a motion vector memory which stores the final motion vector, and a candidate motion vector generator which selects the candidate motion vector from one of the final motion vector stored in the motion vector memory and an externally input motion vector, and provides the selected candidate motion vector to the prediction motion estimation part. Further, the externally input motion vector may be one of a global vector, a user-defined vector, and a zero vector.

The motion vector selection part may further comprise a motion vector selector which selects one of a motion vector output from the prediction motion estimation part and a motion vector output from the full search motion estimation part and outputs the final motion vector, a threshold value table which stores the threshold value, and an adaptive threshold value selector which compares the stored threshold value with the input motion vectors and controls an output of the motion vector selector so that a motion vector having a position value of a smallest error becomes the final motion vector.

The motion vector selector may use a different threshold according to a type of the candidate motion vector to make the comparisons. A precision of the motion vector estimated by the full search motion estimation part is calculated by using an accumulated value of all pixel differences of the blocks.

A method of motion vector estimation method according to the present invention comprises obtaining a first motion vector based on all blocks in a predetermined search range of a current frame and/or field and a reference frame and/or field, estimating a second motion vector based on ambient blocks about a block in which a candidate motion vector is estimated, and selecting a final motion vector from one of the first and second motion vectors. The final motion vector may be the motion vector having a position value of a smallest error in comparison with a stored threshold value. Further, the estimating of the second motion vector may further comprise providing the candidate motion vector.

The estimating of the second motion vector may use one of the final motion vector, a global motion vector, a zero motion vector and a user-defined motion vector as the candidate motion vector. In the selecting of the final motion vector, the threshold value may vary according to a type of motion vector compared.

BRIEF DESCRIPTION OF THE DRAWINGS

The above and other objects and features of the present invention will become more apparent by describing in detail an embodiment thereof with reference to the attached drawings, in which.

DETAILED DESCRIPTION OF THE PREFERRED EMBODIMENT

Figure 1:
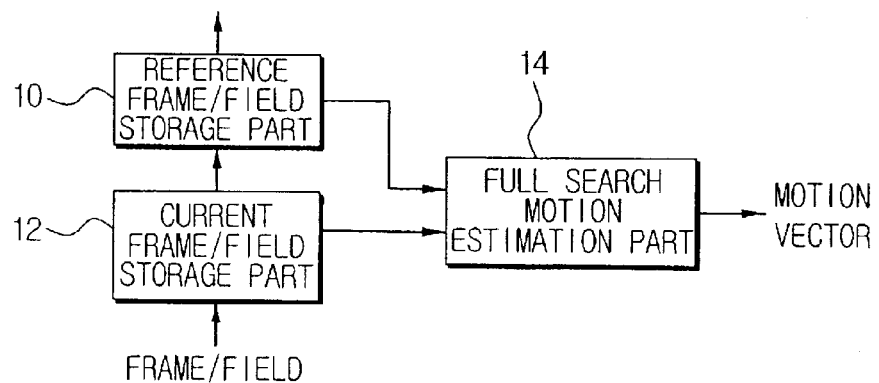
FIG. 1 is a block diagram of a conventional full search motion estimation apparatus.
Figure 2:
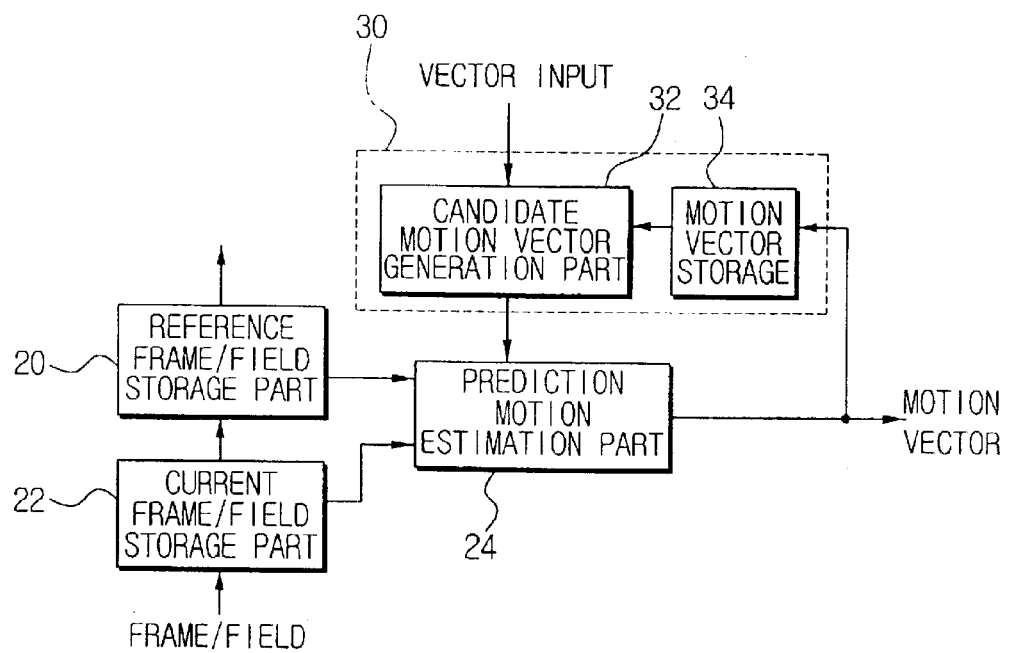
FIG. 2 is a block diagram of a conventional prediction motion estimation apparatus.

Reference will now be made in detail to the present embodiments of the present invention, examples of which are illustrated in the accompanying drawings, wherein like reference numerals refer to like elements throughout.

Figure 3:
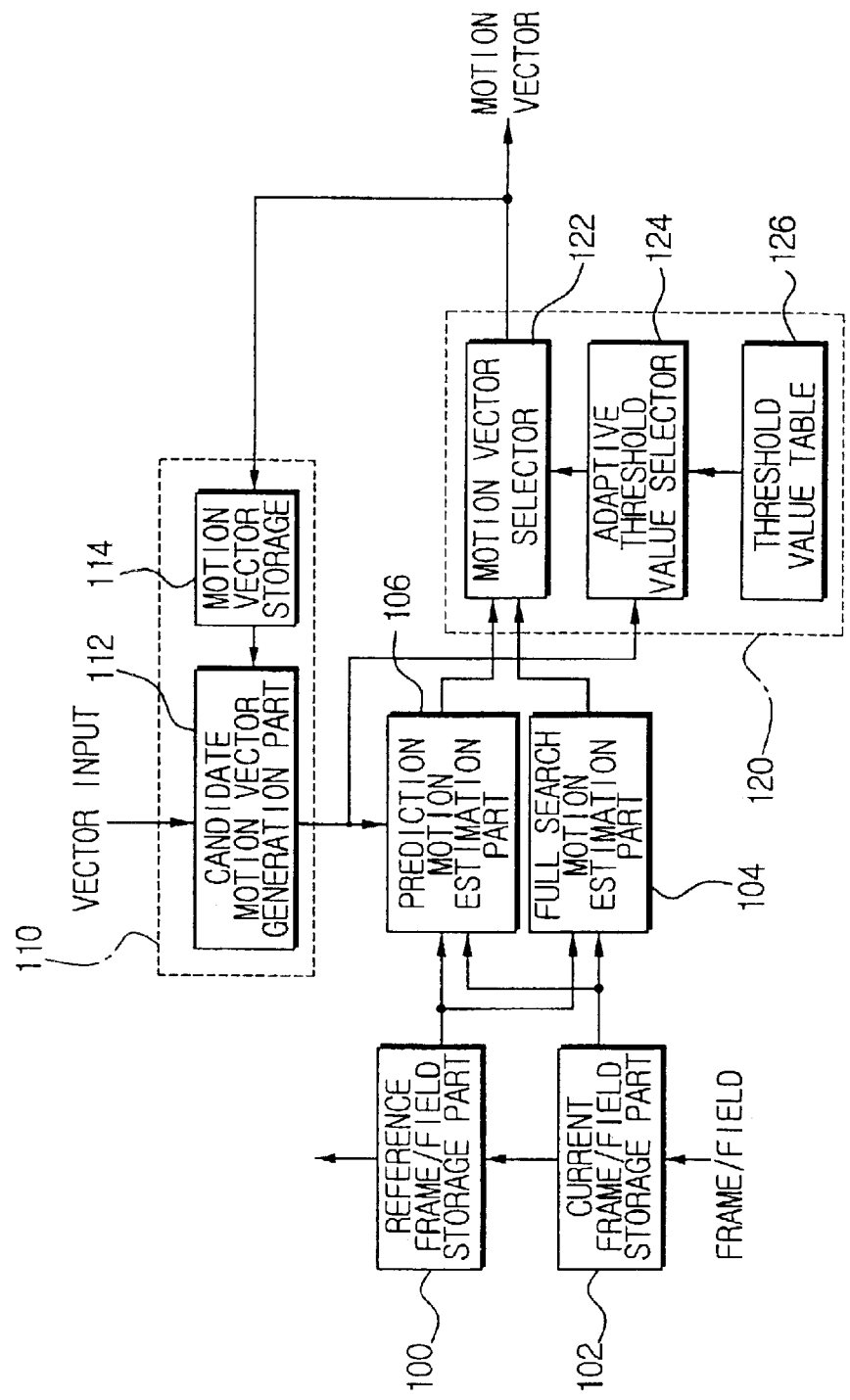
FIG. 3 is a block diagram of a motion estimation apparatus according to an embodiment of the present invention.

FIG. 3 is a block diagram of a motion estimation apparatus according to an embodiment of the present invention.

The motion estimation apparatus shown in FIG. 3 comprises a reference frame/field storage part 100, a current frame/field storage part 102, a full search motion estimation part 104, a prediction motion estimation part 106, a candidate vector generation part 110, and a motion vector selection part 120.

The candidate vector generation part 110 comprises a candidate motion vector generator 112 and a motion vector storage 114. The motion vector selection part 120 comprises a motion vector selector 122, an adaptive threshold value selector 124, and a threshold value table 126.

The reference frame/field storage part 100 and the current frame field storage part 102 store a reference frame/field and a current frame/field, respectively, which are useable for motion vector estimations. The full search motion estimation part 104 estimates a motion vector by a full search motion estimation algorithm. The prediction motion estimation part 106 estimates motion vectors from ambient blocks about a few blocks estimated as candidate motion vector blocks given from the candidate vector generation part 110.

The motion vector selection part 120 compares a stored threshold value with a motion vector estimated by the full search motion estimation part 104 and a motion vector estimated by the prediction motion estimation part 106 and selects a motion vector at a position of the smallest error based on the comparison. A plurality of threshold values may be stored in the threshold table 126, and the adaptive threshold value selector 124 selects an appropriate threshold value according to a kind of a candidate motion vector employed, and controls an output of the motion vector selector 122.

A motion vector selected by the motion vector selection part 120 is output for external use, and, at the same time, the selected motion vector is stored in the motion vector storage 114 to be used by the motion vector generator 112.

As a candidate motion vector provided to the prediction motion estimation part 106 from the candidate vector generation part 110, the motion vector selected by the motion vector selection part 120 may be employed, or an externally input motion vector may be employed.

Figures 4, 5:
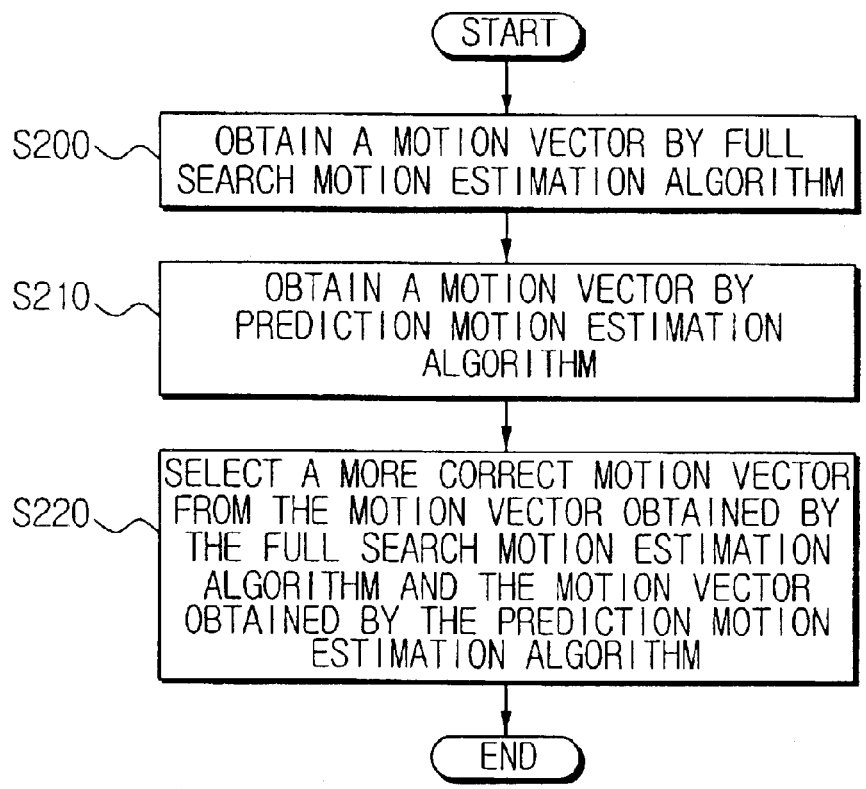
FIG. 4 is a flow chart illustrating a motion estimation algorithm according to an embodiment of the present invention.
FIG. 5 is a view for showing a candidate motion vector block and ambient blocks of the candidate motion vector block.

FIG. 4 is a flow chart for estimating a motion vector using the motion vector estimation apparatus shown in FIG. 3.

In the flow chart the motion vector estimation apparatus obtains a motion vector by the full search motion estimation algorithm within a search range with reference to the current frame/field and the reference frame/field at operation S200.

In order to obtain a motion vector by the full search motion estimation algorithm, firstly, a search range is defined. If a motion of a reference block of an N×N size within a current frame/field $f_n$ is estimated in a range as ±p pixels on a reference frame/field f', the size of a motion estimation range within the reference frame/field becomes (N+2p)×(N+2p), wherein, after all the correlation coefficients are calculated at a total of $(2p+1)^2$ positions which are possible candidates of a motion vector, a position indicating a maximum correlation degree is determined as a motion vector.

In order to estimate a motion vector having the maximum correlation degree, evaluation functions of MSE (Mean Square Error), MAE (Mean Absolute Error), MAD (Mean Absolute Difference), or the like, may be used. MAD denotes an average value of a summation of absolute differences. MSE and MAE may be determined as shown in expressions (1) and (2) below.

$$MSE(i,j) = \frac{1}{MN} \sum_{m=0}^{M} \sum_{n=0}^{N} [S_{t,k}(m,n) - S_{t-1,k}(m+i,n+j)]^2 \quad (1)$$

$$MAE(i,j) = \frac{1}{MN} \sum_{m=0}^{M} \sum_{n=0}^{N} |(S_{t,k}(m,n) - S_{t-1,k}(m+i,n+j)| \quad (2)$$

Wherein, $S_{t,k}$ denotes the k-th macroblock in the t-th frame/field, and $S_{t-1,k}$ denotes the k-th macroblock in the (t−1)th frame/field; m and n denote a value in an M×N macroblock; and i and j are integers. Such evaluation functions select a motion vector in case of the smallest MAD value or MES value, based on a difference of pixels.

A motion vector is obtained by the prediction motion estimation algorithm at operation 200 while a motion vector is obtained by the full search motion estimation algorithm (S210). The prediction motion estimation algorithm obtains a motion vector from ambient blocks around the blocks in which candidate motion vectors provided by the candidate vector generation part 110 are estimated.

FIG. 5 shows a candidate motion vector block $V_0$ employed in the prediction motion estimation part 106 and ambient blocks ($V_1$ through $V_8$) around the block $V_0$. In FIG. 5, the shaded portion indicates the candidate motion vector block. If the candidate motion vector block and motion vectors of the ambient blocks surrounding the candidate motion vector block are defined as Vi(i=0, . . . , 8), the respective motion vectors are set as initial motion vectors of the current block, and a final motion vector is determined by expression (3) below.

$$\hat{V} = arg \min_{v \in \hat{s}, x \in B} \sum |f(x - v - \vec{V}, n-1) - f(x + v + \vec{V}_i, n)|, i = 0, \ldots, 8 \quad (3)$$

where: B denotes a block; s denotes a search region; V denotes a motion vector; and $V_i$ denotes a motion vector from ambient blocks around a candidate motion vector.

A motion vector of a block having the smallest sum of absolute difference (SAD) out of the motion vectors obtained from such ambient blocks is determined as a motion vector of a current block.

A candidate motion vector provided to the prediction motion estimation part 106 from the candidate vector generation part 110 is basically a current motion vector, but a global motion vector, zero motion vector, or a user-defined motion vector is also useable.

The global motion vector is obtainable by using an input motion vector and estimating a global mobility. That is, a histogram of a motion vector of each block is obtained, and then a dominant is determined from the histogram, which is determined as the global motion vector. A formula for this may be expressed as follows.

First, a histogram of a motion vector of each block is obtained. Here, if histograms in horizontal and vertical directions are denoted as $h_x$, $h_y$, existence of a global motion may be determined according to expression (4) below.

$$\text{global motion} = \begin{cases} \text{yes, if } I_x \neq 0 \text{ or } I_y \neq 0 \\ \text{no, otherwise} \end{cases} \quad (4)$$

where: $I_x$ and $I_y$ are defined by expressions (5) and (6) below.

$$I_x = \{k | k \in [-sr, sr], k \neq 0, h_{x(k)} > \epsilon_p\} \quad (5)$$

$$I_y = \{k | k \in [-sr, sr], k \neq 0, h_{y(k)} > \epsilon_p\} \quad (6)$$

where −sr, sr denotes a search range, $\epsilon_p$ denotes a threshold value, and k denotes a variable in the histogram, $h_x(k)$m, $h_y(k)$. In here, a global motion vector $v^g = (v_x^g, v_y^g)^T$, wherein T denotes a transpose, is denoted in expressions (7) and (8) below.

$$v_x^g = arg \max_{k \in [-sr, sr]} h_x(k) \quad (7)$$

$$v_y^g = arg \max_{k \in [-sr, sr]} h_y(k) \quad (8)$$

Where there is little or no motion, a zero motion vector is useable as a candidate motion vector, and another user-defined motion vector is useable as the candidate motion vector.

The motion vector selection part 120 compares the motion vector obtained from the prediction motion vector estimation algorithm and the full search motion vector algorithm with a threshold value stored in a threshold value table 126, and selects a motion vector at a position of the smallest error as the output motion vector at operation S220. At this time, the threshold value may be differently set for use according to the candidate motion vectors, and the adaptive threshold value selector 124 selects an appropriate threshold value according to the candidate motion vector employed. By doing so, a smooth and correct motion vector can be estimated.

As mentioned above, with the present invention, more smooth and correct motion vectors can be obtained than motion vectors estimated with the full search motion estimation algorithm, and motion vectors incorrectly estimated in the prediction motion estimations can be prevented from continuing to be used as candidate motion vectors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motion vector estimation apparatus, comprising:
   a full search motion estimation part which obtains a first motion vector from all blocks in a predetermined search range based on a current frame and/or field and a reference frame and/or field;
   a prediction motion estimation part which estimates a second motion vector from ambient blocks about a block in which a candidate motion vector is estimated; and
   a motion vector selection part which selects one of the first and second motion vectors as a final motion vector.

2. The motion vector estimation apparatus as claimed in claim 1, wherein the final motion vector is a motion vector having a position value of a smallest error in comparison with a stored threshold value among the first and second motion vectors.

3. The motion vector estimation apparatus as claimed in claim 1, further comprising a candidate motion vector generation part which provides the prediction motion estimation part with the candidate motion vector.

4. The motion vector estimation apparatus as claimed in claim 3, wherein the candidate vector generation part comprises:
   a motion vector memory which stores the final motion vector; and
   a candidate motion vector generator which selects the candidate motion vector from one of the final motion vector stored in the motion vector memory and an externally input motion vector, and provides the selected candidate motion vector to the prediction motion estimation part.

5. The motion vector estimation apparatus as claimed in claim 4, wherein the external motion vector is one of a global vector, a user-defined vector, and a zero vector.

6. The motion vector estimation apparatus as claimed in claim 1, wherein the motion vector selection part comprises:
   a motion vector selector which selects one of the first and second motion vectors and outputs the final motion vector;
   a threshold value table which stores a threshold value; and
   an adaptive threshold value selector which compares the stored threshold value with the first and second motion vectors and controls the motion vector selector so that a motion vector having a position value of a smallest error becomes the final motion vector.

7. The motion vector estimation apparatus as claimed in claim 6, further comprising:
   a candidate motion vector generation part which provides the prediction motion estimation part with the candidate motion vector; and
   wherein:
      the motion vector selector uses a threshold value according to a type of the candidate motion vector provided by the candidate motion vector generator for the comparison.

8. The motion vector estimation apparatus as claimed in claim 1, wherein a precision of the motion vector estimated in the full search motion estimation part is calculated by using an accumulated value of all pixel differences of the blocks.

9. A motion vector estimation method, comprising:
   obtaining a first motion vector based on all blocks in a predetermined search range of a current frame and/or field and a reference frame and/or field;
   estimating a second motion vector based on ambient blocks about a block in which a candidate motion vector is estimated; and
   selecting a final motion vector from one of the first and second motion vectors.

10. The motion vector estimation method as claimed in claim 9, wherein the estimating of the second motion vector further comprises providing the candidate motion vector.

11. The motion vector estimation method as claimed in claim 9, wherein the final motion vector is the motion vector having a position value of a smallest error in comparison with a stored threshold value.

12. The motion vector estimation method as claimed in claim 11, wherein the threshold value varies according to a type of motion vector compared.

13. The motion vector estimation method as claimed in claim 9, wherein:
   the estimating of the second motion vector uses the final motion vector as the candidate motion vector.

14. The motion vector estimation method as claimed in claim 9, wherein:
   the estimating of the second motion vector uses a global motion vector as the candidate motion vector.

15. The motion vector estimation method as claimed in claim 9, wherein:
   the estimating of the second motion vector uses a zero motion vector as the candidate motion vector.

16. The motion vector estimation method as claimed in claim 9, wherein:
   the estimating of the second motion vector uses a user-defined motion vector as the candidate motion vector.

17. A motion vector estimation method, comprising:
   obtaining a first motion vector using a full search motion estimation algorithm;
   obtaining a second motion vector using a candidate motion vector and a prediction motion estimation algorithm;
   determining which of the first and second motion vectors has a position value of a smallest error; and
   adaptively selecting a final motion vector from one of the first and second motion vectors in response to the determination.

18. The method of claim 17, further comprising:
   providing the final motion vector as the candidate motion vector for the obtaining of a next second motion vector.

19. The method of claim 17, wherein the determining comprises:

comparing each of the first and second motion vectors with a respective threshold value to determine the position value of the smallest error.

20. The method of claim 19, further comprising:

providing a threshold value table to store the respective threshold values.

* * * * *